United States Patent [19]
Shimada et al.

[11] Patent Number: 5,870,157
[45] Date of Patent: Feb. 9, 1999

[54] LIQUID CRYSTAL DISPLAY DEVICE HAVING OVERLAPPING COLOR FILTERS

[75] Inventors: Takayuki Shimada, Yamatokoriyama; Yuzuru Kanemori, Nara; Mikio Katayama, Ikoma, all of Japan

[73] Assignee: Sharp Kabushiki Kaisha, Osaka, Japan

[21] Appl. No.: 721,333

[22] Filed: Sep. 26, 1996

[30] Foreign Application Priority Data

Sep. 27, 1995 [JP] Japan ..................................... 7-249513
Sep. 20, 1996 [JP] Japan ..................................... 8-250722

[51] Int. Cl.$^6$ ....................... G02F 1/1335; G02F 1/1333; G02F 1/136; G02F 1/1343
[52] U.S. Cl. .......................... 349/106; 349/109; 349/111; 349/44; 349/139
[58] Field of Search .................... 349/106, 111, 349/44, 109, 139

[56] References Cited

U.S. PATENT DOCUMENTS

| | | | |
|---|---|---|---|
| 4,470,667 | 9/1984 | Okubo et al. | 349/106 |
| 4,687,298 | 8/1987 | Aoki et al. | 349/106 |
| 4,688,896 | 8/1987 | Castleberry | 349/55 |
| 4,776,675 | 10/1988 | Takaochi et al. | 349/106 |
| 4,869,576 | 9/1989 | Aoki et al. | 349/106 |
| 5,032,883 | 7/1991 | Wakai et al. | 257/59 |
| 5,040,875 | 8/1991 | Noguchi et al. | 349/106 |
| 5,113,274 | 5/1992 | Takahashi et al. | 349/109 |
| 5,166,085 | 11/1992 | Wakai et al. | 437/40 |
| 5,335,102 | 8/1994 | Kanemori et al. | 349/42 |
| 5,386,306 | 1/1995 | Gunjima et al. | 349/106 |
| 5,414,547 | 5/1995 | Matsuo et al. | 349/44 |
| 5,418,635 | 5/1995 | Mitsui et al. | 349/113 |
| 5,493,429 | 2/1996 | Kanemoto et al. | 349/106 |
| 5,568,293 | 10/1996 | Takao et al. | 349/106 |
| 5,585,951 | 12/1996 | Noda et al. | 349/42 |
| 5,641,974 | 6/1997 | den Boer et al. | 257/59 |

FOREIGN PATENT DOCUMENTS

| | | |
|---|---|---|
| 58-184929 | 10/1983 | Japan . |
| 62-115420 | 5/1987 | Japan ..................................... 349/106 |
| 62-135810 | 6/1987 | Japan . |
| 135351 | 7/1989 | Japan . |
| 4307521 | 10/1992 | Japan . |
| 474714 | 11/1992 | Japan . |
| 6230422 | 8/1994 | Japan . |
| 7-122719 | 12/1995 | Japan . |

OTHER PUBLICATIONS

Fujita et al: "Colorless Polyimide," vol. 29, No. 1 (Jun. 1991), pp. 20–28.

Sakamoto et al: "27.3: A High–Aperture–Ratio 3–in.–Diagonal VGA a–Si Light Valve with Pixel/Data and Pixel/Gate Lines Overlapping," *SID 96 Digest*, pp. 681–684, 1996.

Kim et al: "4:3: High–Aperture and Fault–Tolerant Pixel Structure for TFT–LCDs," *SID 95 Digest*, pp. 15–18, 1995.

*Primary Examiner*—William L. Sikes
*Assistant Examiner*—Toan Ton
*Attorney, Agent, or Firm*—Nixon & Vanderhye P.C.

[57] ABSTRACT

A liquid crystal display device of the present invention includes: a active matrix substrate; a liquid crystal layer; and a counter substrate opposing the active matrix substrate with the liquid crystal layer interposed therebetween. The active matrix substrate includes a plurality of scanning lines, a plurality of signal lines crossing the scanning lines, a plurality of switching elements each provided near a crossing of each scanning line and each signal line, an insulating film, and a plurality of pixel electrodes at least partially overlapping the scanning lines and the signal lines with the insulating film interposed therebetween. The counter substrate includes a plurality of color filters. Adjoining color filters of different colors on the counter substrate at least partially overlap each other at a position corresponding to a boundary between adjoining pixel electrodes on the active matrix substrate.

17 Claims, 7 Drawing Sheets

LIQUID CRYSTAL DISPLAY DEVICE HAVING OVERLAPPING COLOR FILTERS

RELATED APPLICATION

This application is related to copending application Ser. No. 08/695,632, filed Aug. 12, 1996.

BACKGROUND OF THE INVENTION

1. Field of the Invention

The present invention relates to a liquid crystal display device having switching elements such as thin film transistors (hereinafter referred to as "TFTs").

2. Description of the Related Art

FIG. 6 shows an exemplary circuit configuration of a conventional liquid crystal display device having TFTs. A plurality of pixel electrodes 101 are provided on an active matrix substrate (not shown) in a matrix. In FIG. 6, a TFT 102 as a switching element is connected to each pixel electrode 101. A gate electrode of each TFT 102 is connected to a gate line 103. The TFTs 102 are controllably driven by gate signals input to the gate electrodes of the TFTs 102 through the gate lines 103.

A source electrode of each TFT 102 is connected to a source line 104. When the TFTs 102 are driven, data (display) signals are input to the pixel electrodes 101 through the source lines 104 and the TFTs 102. The gate lines 103 and the source lines 104 each run alongside the pixel electrodes 101 so as to substantially orthogonally cross each other.

A drain electrode of each TFT 102 is connected to the pixel electrode 101 and one terminal of a storage capacitor 105. The other terminal of the storage capacitor 105 is connected to a common line 106. Each common line 106 is connected to a common electrode Vcom.

The active matrix substrate having such a configuration is attached to a counter substrate with a liquid crystal layer interposed therebetween. Thus, the liquid crystal display device is produced.

In order to realize color display in such a liquid crystal display device, most typically, color filters are provided on the counter substrate. FIG. 7 is a plan view showing a configuration of a portion in the vicinity of a boundary between two adjoining pixels having color filters of different colors. Herein, it is assumed that color filters 113 are arranged in stripes, the most commonly employed arrangement in a display panel for a lap-top computer or the like.

The color filters 113 which include individual color filters 111 and 112 are formed of a resin having pigments or the like dispersed therein. The color filters 113 have a thickness of about 1 μm. In order to obviate both a lack of a color and a combination of colors, the color filters 111 and 112 need to be provided with an interval d1 therebetween so as not to overlap each other. Although there is variation among the intervals d1 depending on the fabrication process, the interval d1 generally needs to be at least about 5 μm. Moreover, in order to prevent light from leaking through between the filters, an overlap margin d2 needs to be provided so that a black matrix 107 and the color filters 113 provided on the counter substrate overlap each other with certainty. The overlap margin d2 also needs to be at least about 5 μm. Consequently, a line width of the black matrix 107 on the counter substrate needs to be at least (d1+2×d2).

Since no voltage is applied to portions of the liquid crystal layer between adjoining pixel electrodes 101, the orientation of liquid crystal molecules in these portions is not controlled. A line 110 needs to be provided on the active matrix substrate with a certain distance from the pixel electrode 101. Therefore, as well as to obviate both the lack of a color and the combination of colors, and in order to block light incident on the portions between the line 110 and the pixel electrode 101, the black matrix 107 needs to be provided on the counter substrate with the line width thereof being at least (d1+2×d2).

In other words, the line width of the black matrix 107 needs to be about (d1+2×d2) or more regardless of how the color filters 113 are configured. For these reasons, the line width of the black matrix 107 cannot be set smaller than (d1+2×d2). Thus, there is a problem that an aperture ratio of the liquid crystal display device cannot be improved to a satisfactory level.

SUMMARY OF THE INVENTION

A liquid crystal display device of the present invention includes: a active matrix substrate; a liquid crystal layer; and a counter substrate opposing the active matrix substrate with the liquid crystal layer interposed therebetween. The active matrix substrate includes a plurality of scanning lines, a plurality of signal lines crossing the scanning lines, a plurality of switching elements each provided near a crossing of each scanning line and each signal line, an insulating film, and a plurality of pixel electrodes at least partially overlapping the scanning lines and the signal lines with the insulating film interposed therebetween. The counter substrate includes a plurality of color filters. Adjoining color filters of different colors on the counter substrate at least partially overlap each other at a position corresponding to a boundary between adjoining pixel electrodes on the active matrix substrate.

In one embodiment of the invention, the scanning lines and the signal lines provided on the active matrix substrate also serve as a light-blocking pattern at a boundary between adjoining pixel electrodes.

In another embodiment of the invention, surfaces of the scanning lines and the signal lines are formed of a nitride film or an oxide film in order to improve the effectiveness of light blocking.

In another embodiment of the invention, a light-blocking pattern is provided on a boundary between two adjoining pixels having color filters of different colors.

According to another aspect of the invention, a liquid crystal display device includes: a first substrate; a liquid crystal layer; and a second substrate opposing the first substrate with the liquid crystal layer interposed therebetween, wherein the first substrate includes a plurality of scanning lines, a plurality of signal lines crossing the scanning lines, a plurality of switching elements each provided near a crossing of each scanning line and each signal line, an insulating film, and a plurality of pixel electrodes at least partially overlapping the scanning lines and the signal lines with the insulating film interposed therebetween, the second substrate includes a light-blocking pattern and a plurality of color filters, the scanning lines and the signal lines provided on the first substrate also serve as a light-blocking pattern at a boundary between adjoining pixel electrodes, and the line width W2 of the light-blocking pattern on the second substrate satisfies the following expressions (where W1a represents the width of the scanning line and the signal line, d3 represents the largest possible alignment shift of the first substrate with respect to the second substrate, and d4 represents the largest possible amount of placement shift of the color filters):

$W2 > 2 \times d4;$ and $(W1a + W2)/2 > d3.$

In one embodiment of the invention, the line width of the light-blocking patten on the counter substrate is smaller than the respective width of the scanning line and the signal line.

Hereinafter, the function of the present invention will be described.

As described above, in accordance with the present invention, the line width of the black matrix can be remarkably small compared to that of a conventional technique. Accordingly, the aperture ratio of the liquid crystal display device can be improved.

The liquid crystal display device of the present invention includes: an active matrix substrate where pixel electrodes overlap scanning lines and signal lines with an insulating film interposed therebetween; and a counter substrate having color filters provided therein. The active matrix substrate and the counter substrate are attached to each other with a liquid crystal layer interposed therebetween. Due to such a configuration, adjoining color filters of different colors on the counter substrate can overlap each other at the boundary between adjoining color filters. Accordingly, no black matrix needs to be provided on the counter substrate. Thus, the aperture ratio of the liquid crystal display device can be further improved.

Scanning lines and signal lines on the active matrix substrate also serve as a light-blocking pattern for blocking light incident on a portion between two adjoining pixels having color filters of different colors. Accordingly, no black matrix needs to be provided on the counter substrate. Due to such a configuration, deterioration of the aperture ratio due to a black matrix on the counter substrate can be alleviated.

In the case where the surfaces of the scanning lines and signal lines on the active matrix substrate are formed of a nitride film, an oxide film or the like, the reflectance of the surfaces is reduced. Thus, a liquid crystal display device with improved display quality can be realized.

The liquid crystal display device of the present invention includes: an active matrix substrate where pixel electrodes overlap scanning lines and signal lines with an insulating film interposed therebetween; and a counter substrate having color filters provided therein. The active matrix substrate and the counter substrate are attached to each other with a liquid crystal layer interposed therebetween. Due to such a configuration, scanning lines and signal lines on the active matrix substrate also serve as a light-blocking pattern for blocking light incident on a portion between two adjoining pixels having color filters of different colors. Moreover, when a black matrix is provided on the counter substrate, the line width of the black matrix can be smaller than that of the scanning lines and the signal lines. Thus, the aperture ratio further can be improved while a realizing desirable display where a lack of a color or a combination of colors is not observed.

Furthermore, since the pixel electrodes overlap the scanning and signal lines provided between two adjoining pixels having color filters of different colors, the aperture ratio of the liquid crystal display device effectively can be improved.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying figures.

EXAMPLE 1

Figure 1:
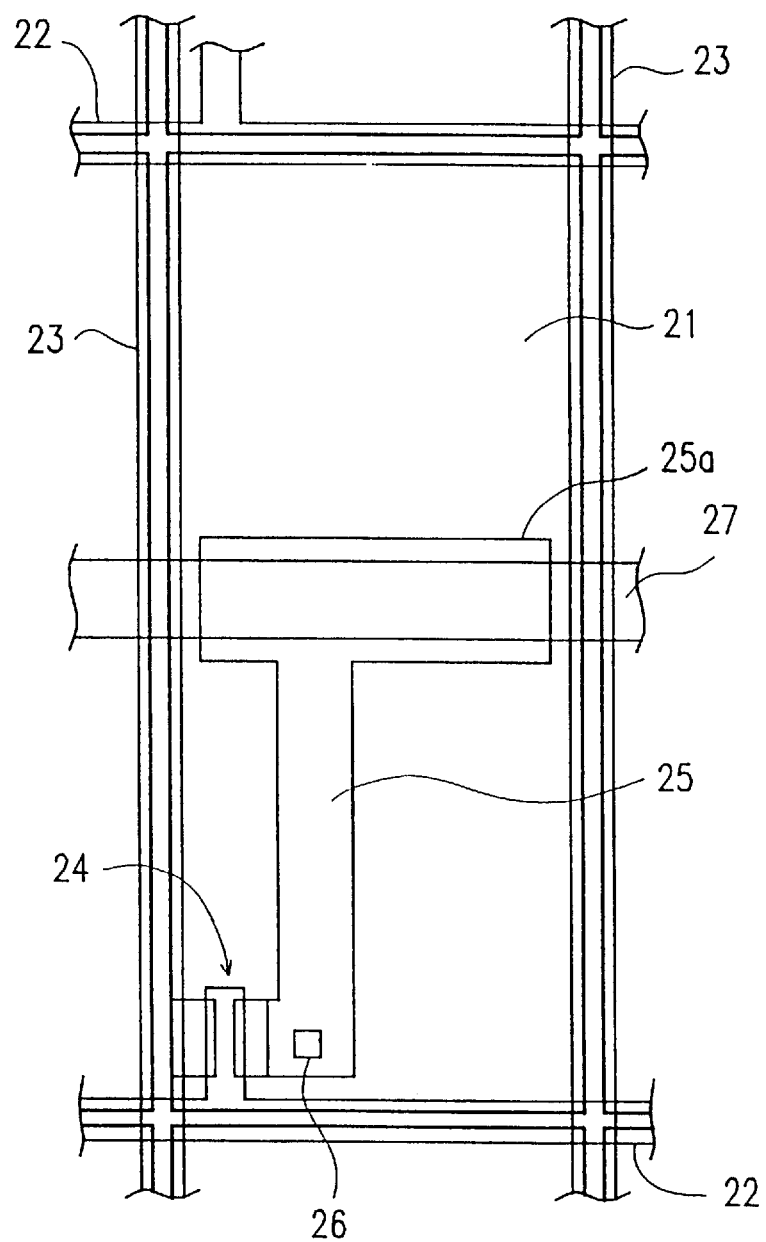
FIG. 1 is a schematic plan view showing a configuration of a liquid crystal display device corresponding to one pixel according to Examples 1 and 2 of the present invention.

FIG. 1 is a plan view showing a configuration of a liquid crystal display device corresponding to one pixel according to Example 1 of the present invention.

Figure 3:
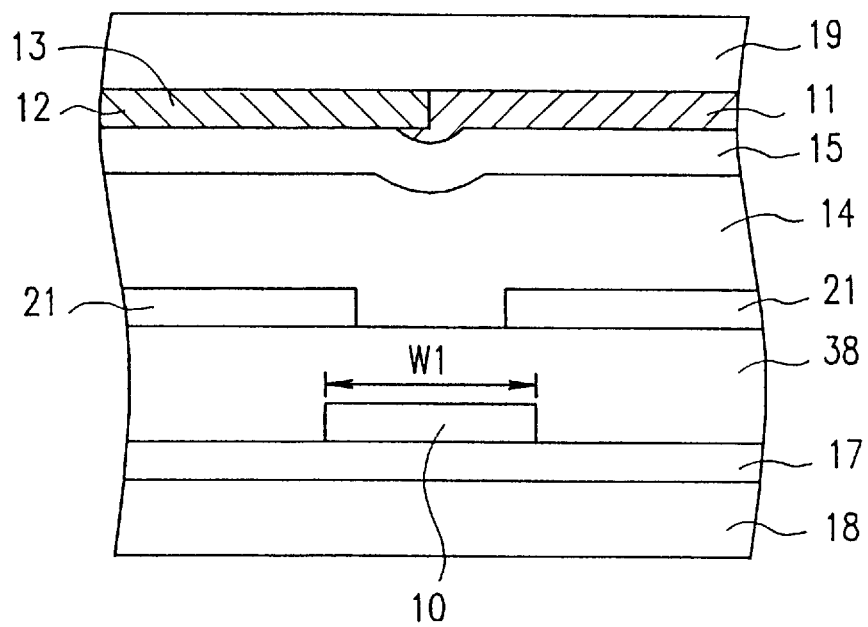
FIG. 3 is a schematic cross-sectional view showing a configuration of a portion of the liquid crystal display device according to Example 1 in the vicinity of a boundary between two adjoining pixels having color filters of different colors.

A plurality of pixel electrodes 21 are provided in a matrix on an active matrix substrate 18 (see FIG. 3). As shown in FIG. 1, a gate line 22 as a scanning line and a source line 23 as a signal line are provided so as to run alongside the pixel electrode 21 while substantially orthogonally crossing each other. The gate line 22 and the source line 23 partially overlap the pixel electrode 21. A TFT 24 as a switching element is connected to the pixel electrode 21. A gate electrode of the TFT 24 is connected to the gate line 22. The TFT 24 is controllably driven by signals input to the gate electrode. A source electrode of the TFT 24 is connected to the source line 23, through which data signals are input to the source electrode of the TFT 24. A drain electrode of the TFT 24 is connected to the pixel electrode 21 via a connecting line 25 and a contact hole 26. The drain electrode is also connected to an electrode 25a. The electrode 25a and an electrode 27 form a storage capacitor. The electrode 27 of the storage capacitor is connected to a common line (not shown).

An interlayer insulating film 38 (see FIG. 3) is provided so as to cover the TFT 24, the gate line 22, the source line 23 and the connecting line 25.

The pixel electrode 21 of a transparent conductive film is provided on the interlayer insulating film 38. The pixel electrode 21 is connected to the drain electrode of the TFT 24 via the contact hole 26 passing through the interlayer insulating film 38.

Figure 2:
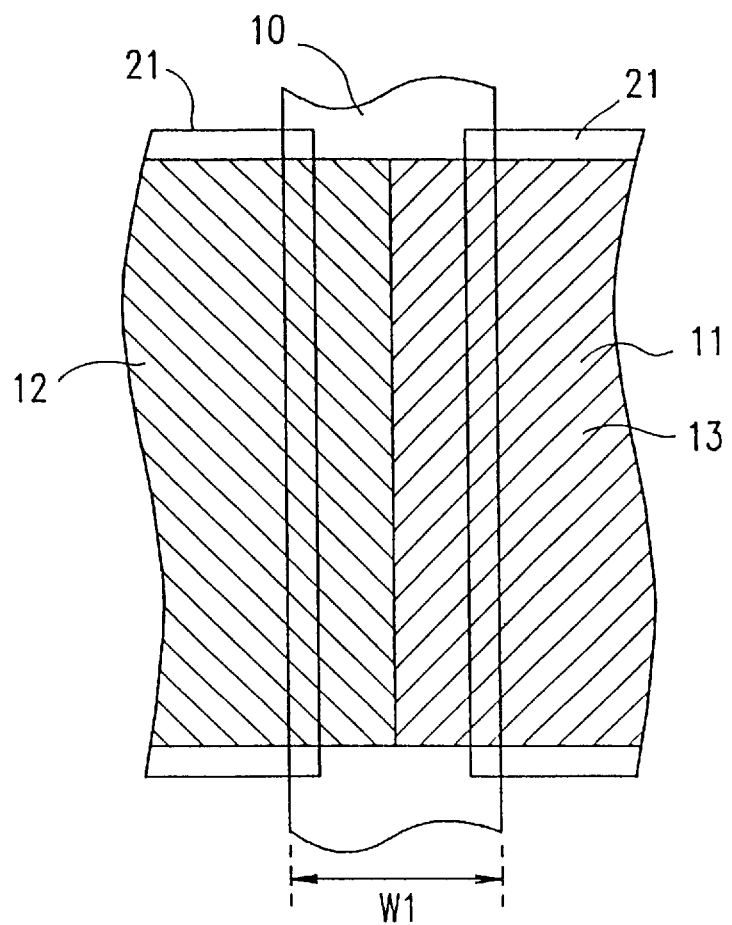
FIG. 2 is a schematic plan view showing a configuration of a portion of the liquid crystal display device according to Example 1 in the vicinity of a boundary between two adjoining pixels having color filters of different colors.

The active matrix substrate 18 having such a configuration is attached to a counter substrate 19 having color filters 13 formed therein with a liquid crystal layer 14 interposed therebetween. The configuration of the liquid crystal display device of the present invention is thus completed. In Example 1, FIG. 2 is a plan view showing a configuration of a portion in the vicinity of a boundary between two adjoining pixels having color filters of different colors; and FIG. 3 is a cross-sectional view showing the configuration of the portion in the vicinity of a boundary between two adjoining pixels having color filters of different colors.

In FIG. 3, reference numerals 11 and 12 respectively denote color filters; and reference numeral 13 denotes a color filter array corresponding to the entire display area. In this specification, the color filter array 13 including a plurality of individual color filters 11 and 12 will be referred to simply as "color filters 13".

According to Example 1, the color filters 13 are so designed that the edges of the color filter 11 and the color filter 12 are substantially aligned in the middle of the width of a line 10 (a gate or source line) provided on the active matrix substrate 18 with a gate insulating film 17 interposed therebetween. In practice, however, the color filters 11 and 12 generally overlap each other due to variations in the fabrication process. Although it is assumed that the line 10 is the source line 23, the line 10 may be the gate line 22. No black matrix is provided on the counter substrate 19. The counter electrode 15 is provided on the color filters 13 on the side of the liquid crystal layer 14.

Due to such a configuration, deterioration of the aperture ratio due to a black matrix on the counter substrate 19 can be alleviated. Accordingly, a liquid crystal display device with high display quality can be realized.

Since no black matrix is provided on the counter substrate 19, the lines 10 (a source or gate line) on the active matrix substrate 18 are also used as a light-blocking pattern for blocking light incident on a portion between two adjoining pixels having color filters of different colors.

In the case where surfaces of the source lines 23 and the gate lines 22 on the active matrix substrate 18 are formed of a nitride film or an oxide film such as tantalum nitride, chromium oxide or alumina, the reflectance of the surfaces is reduced, thereby reducing undesirable reflection of light from outside the device. Accordingly, a liquid crystal display device with further improved display quality can be realized.

In Example 1, it is assumed that: the largest possible alignment shift d3 of the active matrix substrate 18 with respect to the counter substrate 19 is 7 μm; and the largest possible placement shift d4 of the color filters 13 (i.e., the largest possible positional shift of a color filter with respect to the counter substrate 19) is 3 μm. Herein, when the variation of the line width of patterns on the active matrix substrate 18 and the counter substrate 19 is within 1 μm for each side of a pattern, the largest possible alignment shift M of the pattern on the active matrix substrate 18 with respect to the pattern of the color filters 13 on the counter substrate 19 is calculated as in Expression 1 below.

Expression 1

$$M = \sqrt{(d3^2 + d4^2 + 1^2 + 1^2)} = 7.7\,\mu m$$

From this calculation of the largest possible alignment shift M, the width W1 of the lines 10 needs to be about 15.4 μm or more in order to obviate both a lack of a color which occurs when a color filter is positioned too remotely from a line 10 on the active matrix substrate 18; and a combination of colors which occurs when a color filter undesirably overlaps a neighboring pixel.

EXAMPLE 2

Figure 4:
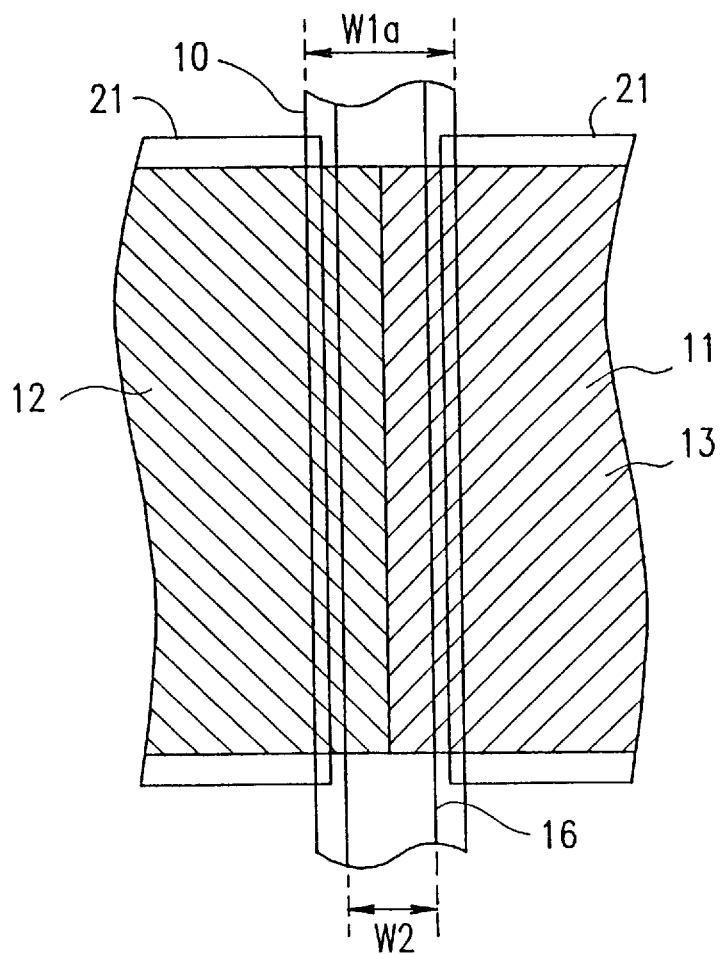
FIG. 4 is a schematic plan view showing a configuration of a portion of the liquid crystal display device according to Example 2 in the vicinity of a boundary between two adjoining pixels having color filters of different colors.
Figure 5:
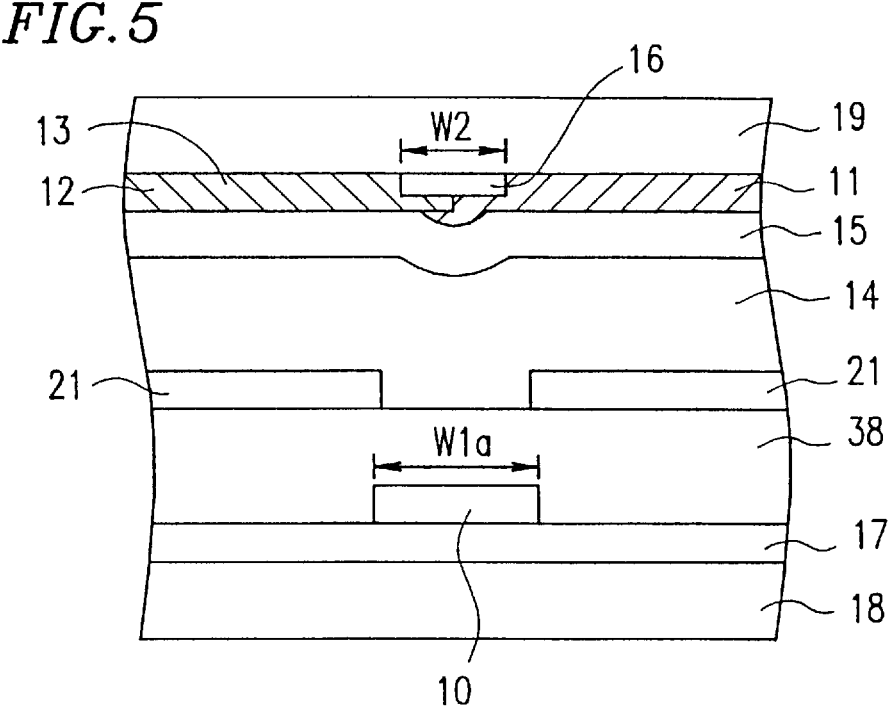
FIG. 5 is a schematic cross-sectional view showing a configuration of a portion of the liquid crystal display device according to Example 2 in the vicinity of a boundary between two adjoining pixels having color filters of different colors.
Figure 6:
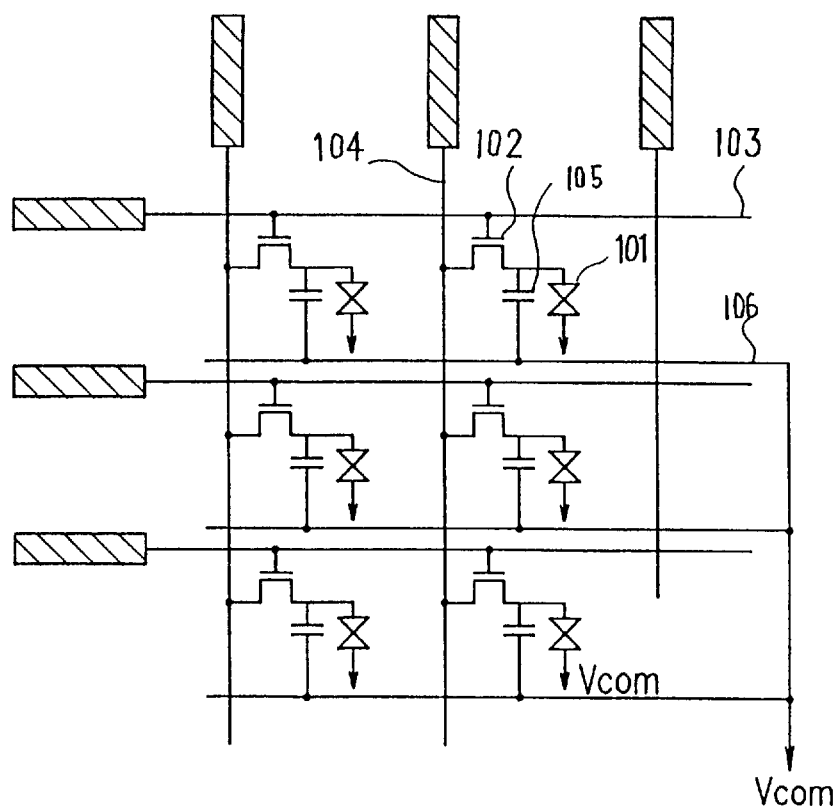
FIG. 6 is a schematic view showing a configuration of the conventional liquid crystal display device.
Figure 7:
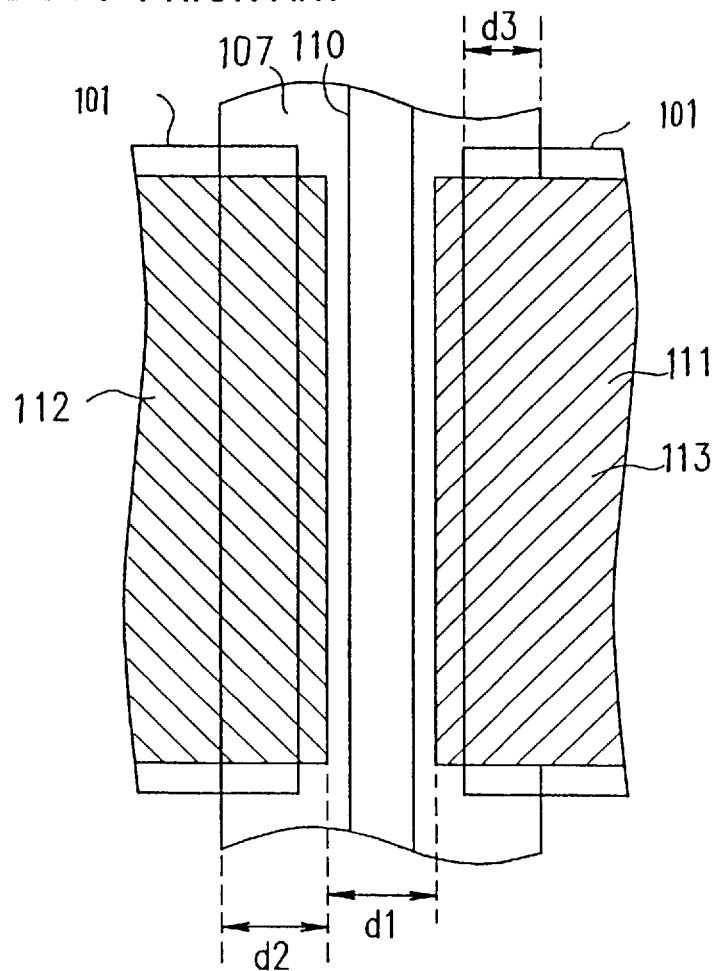
FIG. 7 is a schematic plan view showing a configuration of a portion of the conventional liquid crystal display device in the vicinity of a boundary between two adjoining pixels having color filters of different colors.

FIG. 1 is again referred to in Example 2 since the basic configuration of the liquid crystal display device of Example 2 is the same as that of Example 1. FIG. 4 is a plan view showing a configuration of a portion of the liquid crystal display device according to Example 2 in the vicinity of a boundary between two adjoining pixels having color filters of different colors; and FIG. 5 is a cross-sectional view showing the portion of the liquid crystal display device in the vicinity of a boundary between two adjoining pixels having color filters of different colors.

In Example 2, a color filter 11 and another color filter 12 are provided on a counter substrate 19 so as to overlap each other in the middle of the width of a line 10 provided on an active matrix substrate 18 with a gate insulating film 17 interposed therebetween. Herein, it is assumed that the line 10 is a source line 23 in FIGS. 4 and 5. However, the line 10 may be a gate line 22. Moreover, a black matrix 16 is provided between the counter substrate 19 and the color filters 13 so as to block light incident on portions between two adjoining color filters 11 and 12 of different colors. The line width of the black matrix 16 is very small compared to that of a conventional technique. A counter electrode 15 is provided on the color filters 13 on the side of the liquid crystal layer 14.

The line 10 (a source or gate line) is provided on the active matrix substrate 18 with the gate insulating film 17 interposed therebetween so as to correspond to the portion between two adjoining pixels having color filters of different colors. The lines 10 also serve as a light-blocking pattern for blocking light incident on the portion between the two adjoining pixels.

In the case where the surfaces of the source lines 23 and the gate lines 22 on the active matrix substrate 18 are formed of a nitride film or an oxide film such as tantalum nitride, chromium oxide or alumina, the reflectance of the surfaces is reduced. Thus, a liquid crystal display device with improved display quality can be realized.

According to Example 2, the color filters 13 at least partially overlap the black matrix 16 with certainty. In order to realize this condition, the line width W2 of the black matrix 16 needs to be in such a range as to satisfy Expression 2 below (where d4 represents the largest possible amount of placement shift of the adjoining color filters 13).

Expression 2

$$W2 > 2 \times d4$$

As in Example 1, in order to obviate the lack of a color or the combination of colors, the line 10 on the active matrix substrate 18 and the black matrix 16 on the counter substrate 19 should at least partially overlap each other even in the case where the active matrix substrate 18 and the counter substrate 19 are attached to each other with the largest possible amount of shift with respect to each other. In order to realize this, Expression 3 needs to be satisfied (where W1a represents the width of the line 10).

Expression 3

$$(W1a+W2)/2 > d3$$

From Expression 3, if d3 has the same value as in Example 1, the line width W1a of the line 10 on the active matrix substrate 18 needs to be at least about 8 µm, and the line width W2 of the black matrix 16 provided on the counter substrate 19 needs to be at least about 6 µm.

Thus, in accordance with Example 2, the line width of the black matrix 16 on the counter substrate 19 can be set to be smaller than that of the line 10 on the active matrix substrate 18. As a result, the aperture ratio of the liquid crystal display device can be further improved.

In practice, there is variation of the line width of the resulting black matrix 16 from the fabrication process. However, in accordance with the configuration of the present invention, it is always ensured that the line width of the light-blocking pattern (line 10) on the active matrix substrate 18 and the line width of the black matrix 16 on the counter substrate 19, respectively, are smaller than twice the largest possible amount of attachment shift of the active matrix substrate 18 with respect to the counter substrate 19. Thus, the aperture ratio of the liquid crystal display device can be improved.

EXAMPLE 3

Hereinafter, the interlayer insulating film 38 used in Examples 1 and 2 will be described. The material constituting the interlayer insulating film 38 is an acrylic resin having a dielectric constant of about 3.4 to about 3.8 which is lower than that of an inorganic film (e.g., the dielectric constant of silicon nitride is about 8). Moreover, the acrylic resin has a high transparency. Also, since spin coating is employed, a thickness as large as about 3 µm can be easily obtained. This reduces the capacitances between the line 10 (a gate or source line) and the pixel electrode 21, lowering the time constant. As a result, the influence of the capacitances between the lines 10 and the pixel electrode 21 appearing on the display, such as crosstalk, can be reduced, and thus a good and bright display can be obtained.

The acrylic resin can be patterned by exposure to light and alkaline development so as to include the contact hole 26 having a certain tapered shape. The slope of the taper is desirably gradual so that it facilitates a better connection between the pixel electrode 21 and the connecting electrode 25.

Further, since the photosensitive acrylic resin is used, the thick film having a thickness of several micrometers can be easily formed by spin coating. No photoresist process is required at the patterning step. This is advantageous for production. Though the acrylic resin used as the interlayer insulating film 38 is colored before the coating, it can be made transparent optically by exposing the entire surface to light after the patterning step. The resin can also be made transparent chemically.

In this example, the photosensitive resin used as the interlayer insulating film 38 is, in general, exposed to light from a mercury lamp including the emission spectrum of an i line (wavelength: 365 nm), an h line (wavelength: 405 nm), and a g line (wavelength: 436 nm). The i line has the highest energy (i.e., the shortest wavelength) among these emission lines, and therefore it is desirable to use a photosensitive resin having a reactive peak (i.e., absorption peak) at the i line. This makes it possible to form the contact holes 26 with high precision. Moreover, since the peak is also the farthest from visible light, coloring caused by the photosensitive agent can be minimized. A photosensitive resin reactive to ultraviolet light having short wavelength emitted from an excimer laser can also be used.

It is preferable to use a positive-type photosensitive acrylic resin, which is a photosensitive transparent acrylic resin with high transparency which dissolves in a developing solution after exposure to light. For example, the positive-type photosensitive acrylic resin is preferably a material composed of a copolymer of methacrylic acid and glycidyl methacrylate as a base polymer mixed with a naphthoquinone diazide positive-type photosensitive agent, for example. Since this resin contains the glycidyl group, it can be crosslinked (cured) by heating. After curing, the resin has the properties of: a dielectric constant of about 3.4; and a transmittance of 90% or more for light with a wavelength in the range of 400 to 800 nm. The resin can be decolored in a shorter time by being irradiated with i-line (365 nm) ultraviolet light. Ultraviolet light other than the i line can be used for patterning. Since the heat resistance of the photosensitive acrylic resin used in this example is generally 280° C., the degradation of the interlayer insulating film can be suppressed by conducting the process such as the formation of the pixel electrodes after the formation of the interlayer insulating film at a temperature in the range of about 250° C. to 280° C.

By using such an interlayer insulating film 38 substantially free from coloring, the transmittance of the resultant transmission type liquid crystal display device can be increased. Accordingly, the brightness of the liquid crystal display can be increased or the power consumption of the liquid crystal display can be reduced by reducing the amount of light needed from a backlight.

Since the thickness of the interlayer insulating film 38 is as large as several micrometers, thicker than that in a conventional liquid crystal display, a resin with a transmittance as high as possible is preferably used. The visual sensitivity of a human eye for blue is a little lower than those for green and red. Accordingly, even if the spectral transmittance of the film has slightly lower transmittance for blue light than that for green and red light, the display quality of the present invention will not substantially be deteriorated. Though the thickness of the interlayer insulating film 38 was made about 3 µm in this example, it is not limited to about 3 µm. The thickness of the interlayer insulating film 38 may be set depending on the transmittance and the dielectric constant of the film. In order to reduce the capacitance, the thickness is preferably equal to or greater than about 1.5 µm, more preferably equal to or greater than about 2.0 µm.

In the case where the thickness of the interlayer insulating film 38 is equal to or grater than about 1.5 µm, the capacitance between the pixel electrode 21 and the line 10 (a source or gate line) is small enough to perform a display without crosstalk, even if the overlap width of the pixel electrode 21 and the line 10 is about 1.0 µm or more.

The overlap width should be set in consideration of variations in the actual fabrication process. For example, it is preferably about 1.0 µm or more, because the attachment margin between the pixel electrode 21 and the lines 10 becomes large.

As described above, in accordance with the present invention, the line width of the black matrix can be remarkably small compared to that of a conventional technique. Accordingly, the aperture ratio of the liquid crystal display device can be further improved.

A liquid crystal display device of the present invention includes an active matrix substrate and a counter substrate opposing each other with a liquid crystal layer interposed therebetween. The active matrix substrate includes scanning lines and signal lines, an interlayer insulating film and pixel electrodes. The pixel electrodes at least partially overlap the scanning and signal lines with the insulating film interposed therebetween. The counter substrate includes color filters. In such a configuration, the color filters are arranged so that each color filter overlaps adjoining color filters. Due to such an arrangement, no black matrix needs to be provided on the counter substrate. As a result, the aperture ratio of the present invention can be improved.

According to the present invention, scanning lines and signal lines on the active matrix substrate also serve as a light-blocking pattern for blocking light incident on a portion between two adjoining pixels having color filters of different colors. Due to such a configuration, no black matrix needs to be provided on the counter substrate. As a result, deterioration of the aperture ratio due to a black matrix on the counter substrate can be alleviated.

In the case where surfaces of the scanning lines and the signal lines are formed of a nitride film or an oxide film, the reflectance of the surfaces is reduced. Thus, a liquid crystal display device with improved display quality can be realized.

A liquid crystal display device of the present invention includes an active matrix substrate and a counter substrate opposing each other with a liquid crystal layer interposed therebetween. The active matrix substrate includes scanning lines and signal lines, an interlayer insulating film and pixel electrodes. The pixel electrodes at least partially overlap the scanning and signal lines with the insulating film interposed therebetween. The counter substrate includes color filters. In such a configuration, the scanning and signal lines provided on the active matrix substrate also serve as a light-blocking pattern. Moreover, a black matrix is provided on the counter substrate, the line width of the light-blocking patten on the counter substrate being smaller than the respective width of the scanning line and the signal line. Due to such a configuration, the aperture ratio of the liquid crystal display device can be further improved while realizing a desirable display where a lack of a color or a combination of colors is not observed.

Furthermore, the pixel electrodes overlap the scanning and signal lines provided between two adjoining pixels having color filters of different colors. Due to such a configuration, the aperture ratio of the liquid crystal display device can be effectively improved.

Alternatively, a non-photosensitive organic material may be used for a material of the interlayer insulating film. Examples of the non-photosensitive organic thin film include a thermally curable acrylic resin. More specifically, JSS-924 (2-component system acrylic resin) and JSS-925 (1-component system acrylic resin) manufactured by Japan Synthetic Rubber Co., Ltd. can be used. These resins generally have a heat resistance of 280° C. or more. Using a non-photosensitive resin for the interlayer insulating film allows for freer resin design. For example, polyimide resin can be used. Examples of transparent and colorless polyimide resin include polyimides obtained by the combination of acid anhydrides such as 2,2-bis(dicarboxyphenyl) hexafluoropropylene acid anhydride, oxydiphthalic acid anhydride, and biphenyl tetracaboxylic acid anhydride, with meta-substituted aromatic diamines having a sulfone group and/or an ether group or diamines having a hexafluoropropylene group. These polyimide resins are disclosed in Fujita, et al., Nitto Giho, Vol. 29, No. 1, pp. 20–28 (1991), for example. Among the above transparent and colorless polyimide resins, a resin containing both acid anhydride and diamine each having a hexafluoropropylene group has a high transparency. Fluoric resins other than the above fluoric polyimides can also be used. Fluoric materials have not only excellent colorless transparency but also a low dielectric constant and high heat resistance.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
   a first substrate;
   a liquid crystal layer; and
   a second substrate opposing the first substrate with the liquid crystal layer interposed therebetween, wherein
   the first substrate includes a plurality of scanning lines, a plurality of signal lines crossing the scanning lines, a plurality of switching elements each provided near a crossing of each scanning line and each signal line, a transport insulating film, and a plurality of transparent pixel electrodes at least partially overlapping the scanning lines and the signal lines with the insulating film interposed therebetween,
   the second substrate includes a plurality of color filters, and
   adjoining color filters of different colors on the second substrate at least partially overlap each other at a position corresponding to a boundary between adjoining pixel electrodes on the first substrate and a width of the overlap of adjoining color filters is narrower than a width of the scanning and signal lines.

2. A liquid crystal display device according to claim 1, wherein the scanning lines and the signal lines provided on the first substrate also serve as a light-blocking pattern at a boundary between adjoining pixel electrodes.

3. A liquid crystal display device according to claim 2, wherein surfaces of the scanning lines and the signal lines are formed of a film selected from the group consisting of a nitride film and an oxide film.

4. A liquid crystal display device according to claim 1, wherein a light-blocking pattern is provided on a boundary between two adjoining pixels having color filters of different colors.

5. A liquid crystal display device comprising:
   a first substrate;
   a liquid crystal layer; and
   a second substrate opposing the first substrate with the liquid crystal layer interposed therebetween, wherein
   the first substrate includes a plurality of scanning lines, a plurality of signal lines crossing the scanning lines, a plurality of switching elements each provided near a crossing of each scanning line and each signal line, an insulating film, and a plurality of pixel electrodes at least partially overlapping the scanning lines and the signal lines with the insulating film interposed therebetween, the second substrate includes a light-blocking pattern and a plurality of color filters, the scanning lines and the signal lines provided on the first substrate also serve as a light-blocking pattern at a boundary between adjoining pixel electrodes, and the line width W2 of the light-blocking pattern on the second substrate satisfies the following expressions, where W1a represents a width of the scanning line and the signal line, d3 represents a largest possible alignment shift of the first substrate with respect to the second substrate, and d4 represents a largest possible amount of placement shift of the color filters:

$$W2 > 2 \times d4;$$

and $$(W1a + W2)/2 > d3.$$

6. A liquid crystal display device according to claim 5, wherein the line width of the light-blocking pattern on the second substrate is smaller than the respective width of the scanning line and the signal line.

7. A liquid crystal display device comprising:

a first substrate;

a liquid crystal layer; and a second substrate opposing the first substrate with the liquid crystal layer interposed therebetween, wherein the second substrate is aligned with the first substrate to within a substrate alignment shift (d3), the first substrate includes a plurality of scanning lines, a plurality of signal lines crossing the scanning lines, where the lines are not light reflective and have an average width (W1) and a maximum line width variation, and the first substrate further includes a plurality of switching elements each provided near a crossing of each scanning line and each signal line, an insulating film, and a plurality of pixel electrodes at least partially overlapping the scanning lines and the signal lines with the insulating film interposed therebetween, the second substrate includes a plurality of color filters, wherein the color filters have a maximum positional filter shift (d4) with respect to their alignment with the scanning and signal lines, adjoining color filters of different colors on the second substrate at least partially overlap each other at a position corresponding to a boundary between adjoining pixel electrodes on the first substrate, and wherein the average line width (W1) is equal to or greater than twice the square root of the sum of the square of the substrate alignment shift (d3), the square of the maximum positional filter shift (d4), and twice the square of the maximum line width variation.

8. A liquid crystal display device according to claim 1, wherein the insulating film includes a positive-type photosensitive acrylic resin having a dielectric constant substantially lower than that of an inorganic film.

9. A liquid crystal display device according to claim 8, wherein the acrylic resin has a dielectric constant of about 3.4 to about 3.8.

10. A liquid crystal display device according to claim 8, wherein the insulating film is formed to a thickness of at least about 1.5 $\mu$m.

11. A liquid crystal display device according to claim 10, wherein the insulating film is formed to a thickness of at least about 2.0 $\mu$m.

12. A liquid crystal display device according to claim 11, wherein the insulating film is formed to a thickness of about 3 $\mu$m.

13. A liquid crystal display device according to claim 8, wherein the acrylic resin includes a material composed of a copolymer of methacrylic acid and glycidyl methacrylate as a base polymer mixed with a naphthoquinone diazide positive-type photosensitive agent.

14. A liquid crystal display device according to claim 8, wherein the acrylic resin has a high transpaarency.

15. A liquid crystal display device according to claim 1, wherein the second substrate further includes a light-blocking pattern at the position corresponding to the boundary between adjoining pixel electrodes on the first substrate, and the adjoining color filters of different colors are provided on the light-blocking pattern.

16. A liquid crystal display device according to claim 5, wherein the line width W2 of the light-blocking pattern on the second substrate satisfies the following expression:

$$W1a > W2 > 2d4.$$

17. A liquid crystal display device according to claim 1, wherein a light blocking pattern is provided on the first substrate at the boundary between the adjoining pixel electrodes and the position of the light-blocking pattern corresponds to the overlapped portion of the adjoining color filters of different colors.

* * * * *